United States Patent [19]

Martin et al.

[11] Patent Number: 5,118,057

[45] Date of Patent: * Jun. 2, 1992

[54] CABLE FITTING

[76] Inventors: William B. Martin, 772 Twin View Pl., Pleasant Hill, Calif. 94523; John W. Martin, 743 Santa Anna Dr., Pittsburg, Calif. 94565; Mark L. Bryan, 2700 Bayberry Dr., Lodi, Calif. 95242

[ * ] Notice: The portion of the term of this patent subsequent to Apr. 24, 2007 has been disclaimed.

[21] Appl. No.: 485,545

[22] Filed: Feb. 27, 1990

Related U.S. Application Data

[63] Continuation-in-part of Ser. No. 311,750, Feb. 17, 1989, Pat. No. 4,919,370.

[51] Int. Cl.⁵ .................................................. F16L 5/00
[52] U.S. Cl. ...................................... 248/56; 248/73; 174/153 G
[58] Field of Search ................ 248/56, 68.1, 73, 74.1, 248/221.4, 316.1; 174/153 G; 16/2; 439/459, 460, 470; 24/713.6, 713.2

[56] References Cited

U.S. PATENT DOCUMENTS

| | | | |
|---|---|---|---|
| 2,420,826 | 5/1947 | Irrgang | 16/2 |
| 2,897,533 | 8/1959 | Bull | 16/2 |
| 3,424,856 | 1/1969 | Coldren . | |
| 3,493,205 | 2/1970 | Bromberg . | |
| 3,506,999 | 4/1970 | Neher | 16/2 |
| 3,562,847 | 2/1971 | Jemison | 248/56 |
| 3,564,113 | 2/1971 | Kindler . | |
| 3,991,446 | 11/1976 | Mooney | 411/548 |
| 4,056,252 | 11/1977 | Simon | 248/56 |
| 4,142,064 | 2/1979 | Thomsen | 174/153 G |
| 4,188,003 | 2/1980 | Ramsey | 174/153 G |
| 4,190,222 | 2/1980 | Appleton | 248/56 |
| 4,262,409 | 4/1981 | Madej | 29/526 |
| 4,299,363 | 11/1981 | Datschefski . | |
| 4,350,839 | 9/1982 | Lass | 174/65 |
| 4,361,302 | 11/1982 | Lass | 248/56 |
| 4,366,343 | 12/1982 | Slater et al. | 174/65 |
| 4,474,489 | 10/1984 | Simon | 248/56 |
| 4,919,370 | 4/1990 | Martin | 248/56 |

FOREIGN PATENT DOCUMENTS

| | | | |
|---|---|---|---|
| 2316747 | 10/1974 | Fed. Rep. of Germany | 174/153 G |
| 2700389 | 7/1978 | Fed. Rep. of Germany | 174/153 G |
| 2822643 | 11/1979 | Fed. Rep. of Germany | 174/153 G |
| 2295287 | 7/1976 | France | 248/56 |
| 152065 | 10/1955 | Sweden | 248/56 |
| 1122395 | 8/1968 | United Kingdom | 16/2 |

*Primary Examiner*—Ramon O. Ramirez
*Assistant Examiner*—Robert A. Olson
*Attorney, Agent, or Firm*—Wigman & Cohen

[57] ABSTRACT

The present invention is directed to a cable fitting for insertion in a protective enclosure. The fitting includes one or more cable channels and is constructed of a first staging portion for attachment to the electrical enclosure and a second portion which incorporates strain relief features with gripping teeth for clamping the cable. The fitting is designed for use with one or more cables. In use, it is installed in the panel to the staging position depth, the cable or cables are inserted through the fitting and the panel into the box to the desired position for clamping, and the fitting is inserted into the panel to the installed position to lock the fitting to the box and to clamp the cable within the fitting. The fitting may also be fully inserted and the cable or cables installed thereafter.

23 Claims, 8 Drawing Sheets

CABLE FITTING

CROSS-REFERENCE TO RELATED APPLICATION

This application is a continuation-in-part of application Ser. No. 07/311,750, filed Feb. 17, 1989, now U.S. Pat. No. 4,319,370.

FIELD OF THE INVENTION

The present invention is directed to a cable fitting for securing at least one cable, such as non-metallic (NM) sheath conductor cable through an aperture in the wall of a protective enclosure panel. More specifically, the present invention is generally directed to inexpensive, labor-saving protective cable fittings for inserting and securing at least one and preferably two electrical or other cables into the panel. When fully installed, the cables may not easily be withdrawn from the panel.

DESCRIPTION OF THE PRIOR ART

Insulating bushings and interconnection box cable connecting fittings are well known in the prior art, as illustrated by U.S. Pat. No. 2,948,973 to Hawes; U.S. Pat. No. 3,424,856 to Coldren; U.S. Pat. No. 3,991,446 to Mooney et al; U.S. Pat. No. 4,262,409 to Madej; U.S. Pat. No. 4,299,363 to Datschefski; U.S. Pat. No. 4,350,839 to Lass; U.S. Pat. No. 4,366,343 to Slater; U.S. Pat. No. 4,474,489 to Simon; and particularly U.S. Pat. No. 3,493,205 to Bromberg. The Hawes, Coldren, Mooney et al, Datschefski, Simon, and Bromberg patents are all directed to fittings for installing and securing single sheathed cables to an electrical panel. The sheathed cables may each include multiple conductors and typically may include an outer plastic protective shield. None of these prior art fittings are specifically designed for safely securing two or more cables, such as nonmetallic sheathed cables, to the panel. None provide a plurality of generally rectangular channels, each for housing one or more cables.

Among these prior art patents, the Slater U.S. Pat. No. 4,366,343; the Madej U.S. Pat. No. 4,262,409; and the Lass U.S. Pat. No. 4,350,839 patents disclose devices with structure that permits relatively unrestricted cable entry, but positively inhibits cable withdrawal. Of these, the Slater U.S. Pat. No. 4,366,343 device is an integral portion of the panel (and is thus difficult and expensive to mold). The enclosure, and the Madej device is an essentially 3-piece molding having a split base portion; the latter is both difficult and expensive to mold, and is structurally weak around the periphery of its split base portion.

Great quantities of such cable fittings are required in wiring commercial and residential structures; thus they must be safe, durable, and inexpensive, and they should be easily installed without special tools or involving additional labor. Multiple piece fittings are typically more expensive to mold than single piece fittings and are also typically more difficult and cumbersome to install, thus adding to their installed cost. It is preferred that cable fittings easily accept insertion of the cable while severely restricting cable withdrawal; safety standards entities such as Underwriters' Laboratories often require that such fittings meet stringent antiwithdrawal standards and may also require easy insertion of the cable. Further, the strength and integrity of the cable fitting is believed to be greatly enhanced when at least one end portion is circumferentially uninterrupted, especially the end portion which is snugly fitted to the panel.

Thus, there exists a need in the art for a one-piece, economically molded cable fitting which provides one-way restraint of the cable at the panel, and which includes an uninterrupted end portion of the fitting adjacent the panel for strength.

SUMMARY OF THE INVENTION

The present invention overcomes the limitations noted above with respect to the prior art single-cable devices by providing a cable fitting device having strain relief features and which can be readily installed to connection boxes or enclosure panels and which includes provisions for multiple, as well as single cable attachment and strain relief.

An example of a cable which may be advantageously installed in a box or panel ("panel") is nonmetallic circuit wiring commonly found in house wiring circuits. Panels are normally provided with preformed holes, or have prepunched "knockout" apertures ("apertures"), which are easily removed with hand tools and provide entry apertures for insertion of the cables through the panel. Conventionally, a fitting or box connector is provided which mechanically protects and facilitates securing each of the cables entering the panel.

In a first embodiment, the fitting according to the present invention includes a central passageway divider which cooperates with gripping arms having a camming action about a point determined by a hinge to ensure positive antiwithdrawal gripping of the cable. In a second embodiment, the fitting includes gripping arms of another configuration without a central passageway divider and relies on a camming action of these arms with the cable to ensure positive antiwithdrawal gripping of the cable or cables. No divider is required in the second embodiment.

Basically, the fitting according to a first embodiment of the present invention is formed of a unitary, generally tubular housing having a main passageway therethrough for receiving one or more cables on either side of at least one centrally disposed divider element subdividing the main passageway into two or more channels for the cables. One channel is preferably dedicated for each cable; however, not all of the channels necessarily need be occupied by cable. Individual channels may include also plural cables, size permitting.

According to this first embodiment, at least two arms extend from the housing, which arms are adapted for both outward gripping of the panel and for positive inward gripping of the cable or cables. Two additional extensions are provided solely for gripping the panel, but not the cable.

Flexure of the arms at the hinges permits a camming action of the arms against the divider in the first embodiment of the invention. This camming action results when the cable is withdrawn from the fitting, and ensures a positive gripping of the cable against a corresponding anvil portion of the divider.

The housing may be generally spool-shaped. It has a plurality of longitudinally extending, at least partially arcuate arms terminated with radially outward extending lips or tabs on the exterior thereof. Stop faces are provided for limiting the final insertion depth of the fitting into the panel. The arms are provided with outer first, second, and third tapered shoulder areas for sliding contact with the circumferential rim of the aperture in the panel. The arms are provided with cable gripping elements for gripping the exterior insulation or jacket of the cables passing through the housing.

Insertion of the fitting into the panel past the first shoulder to a first, or staging position facilitates insertion of cable into the panel via the passageway. If the fitting is provided with one or more divider elements according to the first embodiment of the present invention, one or more additional cables may be inserted, generally one per cable channel. Multiple cables per channel may also be appropriate. Insertion of the fitting past the second shoulder up to the flanged stop face in the second, locked position causes compression of the internal gripping teeth into gripping relationship with the cable or cables. In the first embodiment, the divider element or elements act as gripper anvils.

Once the fitting has been fully installed to the second, locked position, it is more difficult to withdraw from the panel. Alternatively, the fitting may be inserted to the staging position, tapped into the second position, then the cable or cables may be inserted. Positive antiwithdrawal stops may be provided to prevent removal of the fitting from the panel.

Other portions of the housing may be adapted to be struck or clamped to grip or engage the cable in the panel. In both embodiments of the invention, the external portion of the fitting may be adapted to provide a rear-end striking surface. In a further variation of the feature of the invention, one or more rearward facing screwdriver slots may be provided to enable driving the fitting securely into the box with a screwdriver, such as an ordinary electrician's screwdriver. In yet another variation of this feature, the fitting may be affixed to the panel and locked by compression of the gripping arms, such as an ordinary pair of channelled adjustable pliers. In another variation, a plurality of retaining ears are provided which may be clamped together for insertion of the fitting through the panel and then released when the fitting is fully inserted through the panel.

In the second embodiment, a similar housing is provided, and a portion of each of the arms is made relatively flexible between the housing and the cable gripping end or head portion. This again facilitates flexure of the arm by a camming type action of the cable gripping head portion relative to the cable and the housing. More specifically, the arms each include a hinge portion in the manner of a so-called 'living hinge' along the arm length between the gripping head and a circumferentially uninterrupted body portion of the housing. The hinge is preferably formed by providing a thinner cross section to the arm along part of its length.

According to the second embodiment of the present invention, at least three arms extend from the housing, two or more of which are adapted for outward gripping of the panel in a temporary first insertion position, and all of which arms are adapted for outward gripping of the panel in a more permanent, fully installed position. Preferably, the fitting has four cable gripping arms, two of which are adapted for gripping the panel in separate steps, allowing the fitting arms to be inserted to a first, staging position before being inserted fully to a locked position.

The flexible hinge permits the internal gripping surfaces or teeth on the gripping head to be drawn more tightly against the cable surface when the cable is tensioned in a withdrawal direction, with the toothed portion of the gripping head being rotated about an axis defined by the hinge. This camming action causes other respective surface areas of the cable to contact other arms, which are thereby also cammed around into firmer gripping contact with the cable, causing one or more of the gripping heads of the other arms to more tightly grip and clamp the cable against withdrawal from the fitting, and thus from the panel.

The gripping heads provide, in cross section, an aperture area through the fitting for cable insertion between inward gripping surfaces of the heads. The aperture is sufficiently large to permit relatively free entry of the cable, yet is of sufficiently restricted cross section (because of the gripping head size) that attempted withdrawal of the cable or cables causes the inward gripping surfaces of the head to tightly grasp the cable. In cross section, the combination of the cable and the gripping heads is too large to pass through the panel aperture.

An important feature of the invention according to this second embodiment is the provision of internal gripping teeth arranged in a particular configuration which has been found to be effective in antiwithdrawal gripping of the cable surface upon teeth-to-cable contact in the withdrawal mode.

The fitting is constructed as a unitary, one-piece structure made of an insulating material, such as a plastic material. Preferably, the fitting is injection molded of plastic.

A first advantage of the invention is the provision of a cable fitting for securing multiple nonmetallic sheath cables to the panel.

Another advantage of the present invention is the provision of an inexpensive, easily manufactured fitting having internal cable gripping features.

Yet another advantage of the invention is the provision of structure on the fitting which permits at least four separate methods for locking the fitting to the panel.

Other objects, features, and advantages of the invention will be apparent from the following description and claims and are illustrated in the accompanying drawings, which disclose by way of example the principles of the invention and the best modes which are contemplated by the inventors for carrying them out.

BRIEF DESCRIPTION OF THE DRAWING FIGURES

The invention is disclosed in several drawing figures wherein the elements of the invention are identified by like reference numerals in all views.

DETAILED DESCRIPTION OF THE PREFERRED EMBODIMENTS

Figure 1:
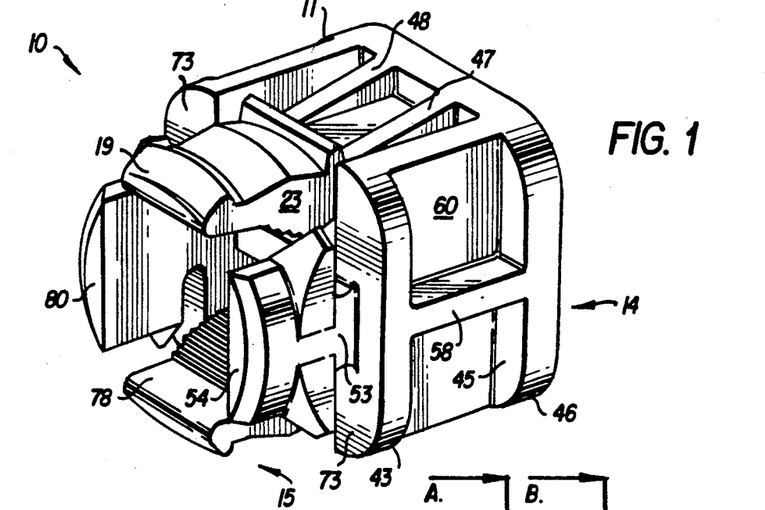
FIG. 1 is a perspective view of the first embodiment of the present invention as viewed from the attachment or proximal end thereof.
Figures 2, 3:
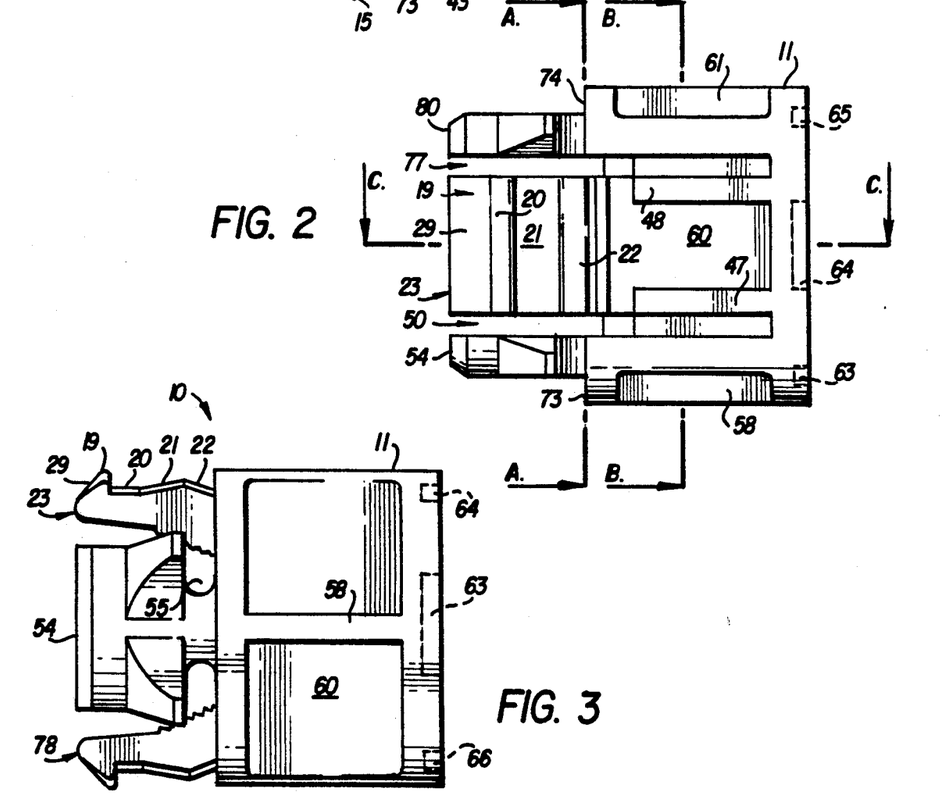
FIG. 2 is a plan view of the first embodiment of the invention with section lines A—A, B—B, and C—C indicated.
FIG. 3 is a side view of the first embodiment of the invention.

There is shown in FIGS. 1 through 11 a fitting 10 constructed in accordance with the first preferred embodiment of the present invention. From housing 11, a plurality of cantilevered arms 23, 78 extend longitudinally outward, including at their extreme ends first tabs or lips 19, which may be radially extending lips having tapered or sloped insertion faces 29 and stop or retaining faces 13 (FIG. 3). Housing 11 may be spool-shaped and have an elongated tubular central portion, or may be of such similar shape as is readily manufactured (such as by injection molding). The embodiment of FIGS. 1 through 11 has a generally rectangular cross section with rounded corners for easy manufacture. Lips 19 may be arcuately curved along their insertion faces 29 to facilitate entry through a round aperture in a panel. Housing 11 is adapted to receive cable at a first, distal wire entry end 14 and which cable exits fitting 10 at a wire exit or proximal end generally indicated by reference numeral 15.

Figures 8, 9:
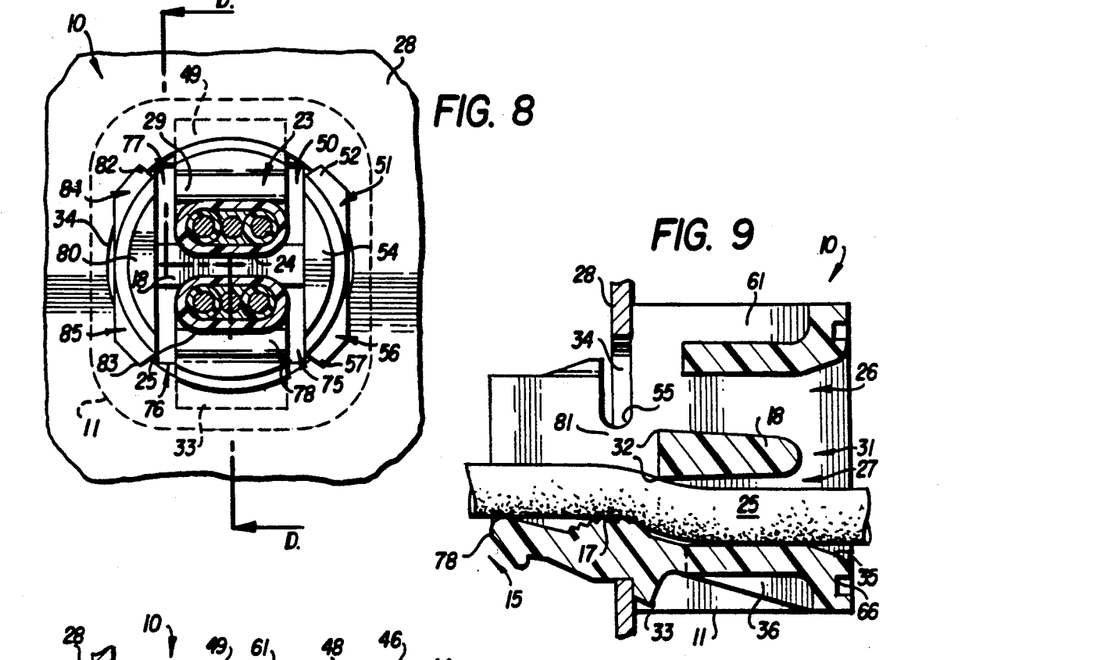
FIG. 8 is a proximal end view of the first embodiment of the invention containing a pair of conventional NM-type cables, as seen from inside the panel.
FIG. 9 is a cross-section view of the first embodiment of the invention containing an NM cable taken at section line D—D.

The arms 23, 78 may for the purposes of the illustrated example be comprised of two generally parallel faces displaced slightly from a plane through the central vertical axis of the fitting 10 as shown, and further may include a plurality of outward faces 20, 21, 22 (FIGS. 2 and 3) and interior face portions. The interior face portions may include a plurality of transverse serrations or gripping teeth 17. These teeth 17 engage the cables 24, 25 when the cables are withdrawn. More specifically, the arms 23, 78 are positioned such that they contact cables 24, 25 by teeth 17. Flexure of the arms permits them to rotate in a camming action into firmer gripping contact with the cables whenever the cables are withdrawn, individually or collectively. The arms are not short enough to permit them to pass backward through the central aperture, thus they lock the cable more tightly as the cable is withdrawn, resulting in a camminglock action. In use, the fitting 10 according to the first embodiment of the invention secures at least one cable 25 (FIGS. 8 through 11) within housing 11 and to an panel 28 through, for example, an aperture 34 in panel 28. FIG. 8 shows a pair of typical NM electrical cables 24, 25 installed in fitting 10 through a panel 28 via an aperture 34.

The housing 11 incorporates a number of structural features, including fitting 10 special front and rear flanges 43, 46. Flange 43 has a thickness dimension between front and rear surfaces 42, 41 (FIG. 1) and flange 46 has a thickness dimension between front and rear surfaces 45 and 44 (FIG. 1). A central passageway 31 is formed by fitting 10 drum 60, which has a thickness dimension and may be round, a rounded square or rectangle, a (preferably regular) polygon or other suitable shape. Joining drum 60 and front and flanges 43, 46 together are a plurality of structural support members such as longitudinal members 58, 61. Member 61 is best seen in FIG. 2. These members 58, 61 may be molded integral with and connect the front surface 45 of flange 46 to the rear surface 41 of flange 43, as well as to the outer surface of drum 60, and may also be formed of an insulating material. A thermal-plastic material may be preferred. Such materials include polyesters and polyolefins and particularly polyethylenes and polypropylene polymers. Flame retardant polyester or flame retardant polypropylene materials of the type meeting Underwriters' Laboratories Section 94-1 rating are preferred. Arms 23, 78 extend from inclined body longitudinal portions formed of similar support members. In the illustrative example described herein, a pair of inclined longitudinal members 47, 48, joined at least partially integral with the surface of drum 60 provide a foundation and structural support for arm 23. More particularly, members 47, 48 are joined with a portion of flange 46 and drum 60. These portions form a reinforced structure which provides stiffness to arm 23 and also facilitates transfer of forces applied to housing 11 rear flange 46 rear surface 45 to projecting arms 23, 78.

Figures 10, 11:
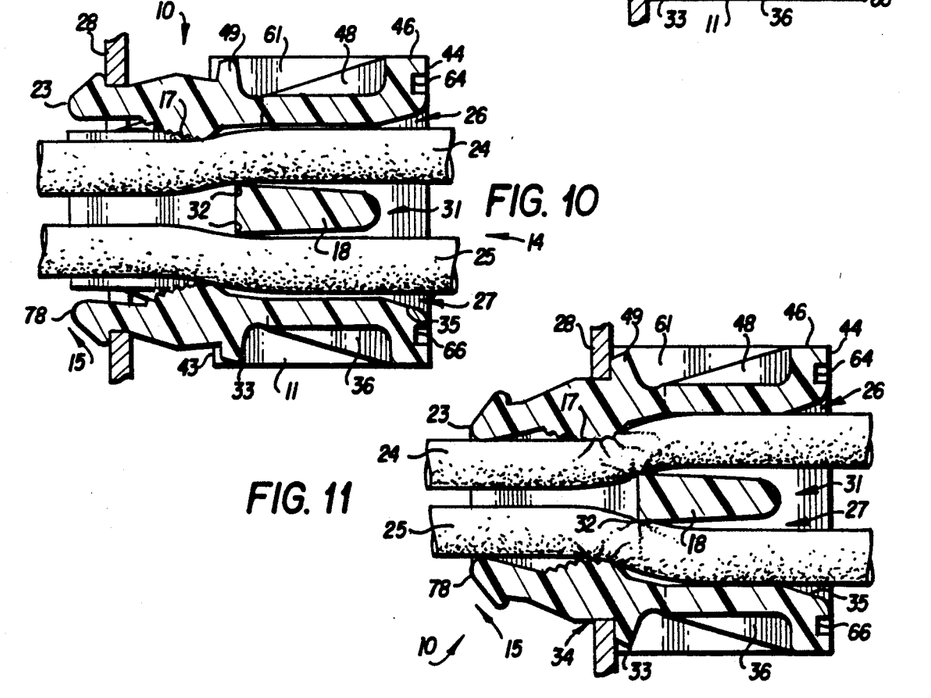
FIG. 10 is a sectional view of the first embodiment of the invention containing a pair of typical NM cables and installed into the panel to a first, or staging position taken at section C—C.
FIG. 11 a sectional view of the first embodiment or the invention containing a pair of typical NM cables and installed into the panel to a second, or fully installed position taken at section line C—C.
Figure 12:
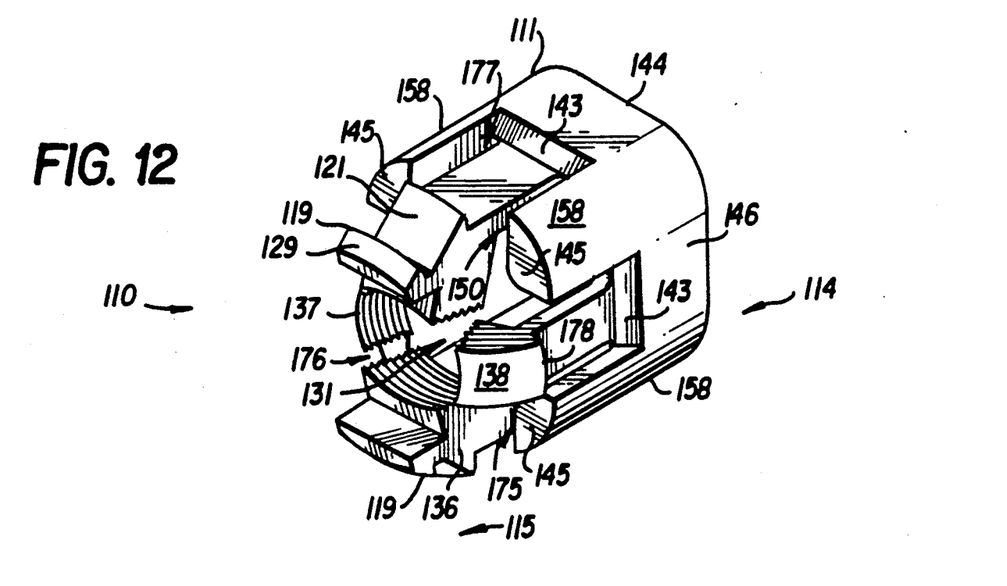
FIG. 12 is a perspective view of fitting of the second embodiment of the invention as viewed from the attachment or proximal end thereof.

One of the bottom inclined longitudinal support members 36 forming a part of housing 11 and arm 78 of the first embodiment is seen in FIGS. 9 through 11 at the bottom of housing 11. Flange 43 is divided around its periphery into substantially similar partial sections 73, 74 by arms 23, 78 and passageway 31, in which sections 73, 74 are separated from top arm 23 by channels 50, 77. These channels in turn may extend slightly beyond the housing 11 and flange 43, into drum 60 and at least partially towards flange 46. This combination enhances free cantilevered movement of arm 23. Similarly, a pair of like channels 75, 76 separate sections 73, 74 from arm 78 which lies therebetween at the bottom. Projecting frontwards from each of the front sections 73, 74 are notched retainer elements, generally attached to semilunar portions 54 and 80, which may be chamfered around the periphery thereof. Semilunar portions 54, 80 are joined to housing 11 respective flange 43 sections 73, 74 front surfaces such as surface 42 by stems, such as stems 53, 81 (see FIGS. 2 and 9) adjacent to the notches, illustrated by notch 55 (FIG. 9).

Figure 7:
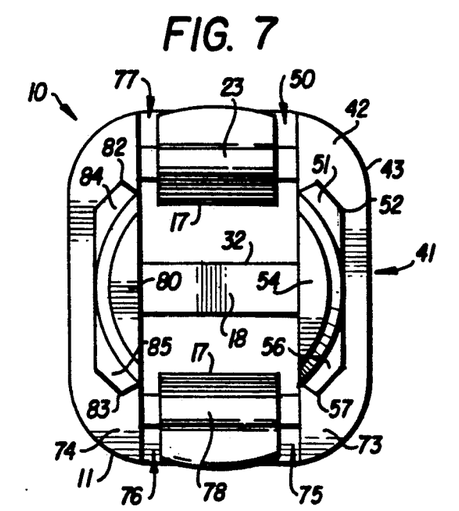
FIG. 7 is an end view of the first embodiment of the invention as seen from the front or proximal end of the device.

Extending rearward from semilunar portions 54, 80 are (respectively) left upper retaining tooth 82, left lower retaining tooth 83, and right upper and lower retaining teeth 52, 57 (see FIG. 7 and 8). These teeth 52, 57 and 82, 83 may have frontward facing sloped surfaces, best shown as surfaces 51, 56 on teeth 52, 57. By way of illustration, surfaces 51, 56 may be shaped to facilitate entry into a panel 28 aperture 34; the partial undercut at notch 55 (see FIGS. 3 and 9) from sections 73, 74 provides added flexibility during installation. Similar notches underlie teeth 57, 82, and 83. Teeth 82, 83 face surfaces 84, 85 are best seen in FIG. 7. Teeth 52, 57, 82, 83 inhibit withdrawal of fitting 10 when it is fully installed. Note that semilunar portions 54, 80 can be sized so as to prevent easy insertion through apertures which are too small and can also be used to stabilize the fitting 10 during installation at the "staging" position, described hereinafter.

A plurality of grooves or notches 63, 64, 65, 66 (FIG. 6) in flange 46 surface 44 enable application of drive force, as by a screwdriver or such equivalent tool.

Figure 4:
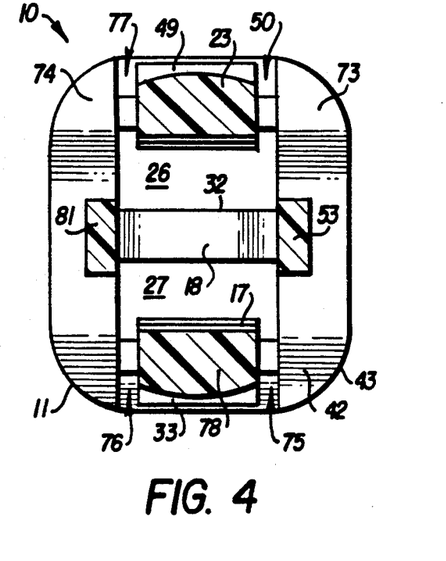
FIG. 4 is a cross-sectional view of the first embodiment of the invention taken at line A—A, and viewed towards the rear or distal end thereof.

From the proximal end 15 of fitting 10 (FIG. 3), a section A—A (in the plane of surface 42) is viewed in FIG. 4 towards distal end 14 of housing 11 of the fitting 10 according to the first embodiment of the present invention. The squared, spool-like shape (in this example) of housing 11 can be seen clearly in FIG. 4 with both front surface 42 of flange 43 sections 73, 74 being shown surrounding passageway 31 (passageway 31 is best viewed in FIGS. 9 through 11), which is divided into two channels 26, 27 in this illustrative example by divider 18. Divider 18 is partially sectioned in this view. Divider 18 terminates in an anvil 32; it is recessed behind plane A—A. Alternatively, stems 53 and 81 may be partially joined by elongation of divider 18 (not shown) for further strength and support if required. Additional gripping teeth may be provided at anvil 32 to more securely grip a cable.

Figure 5:
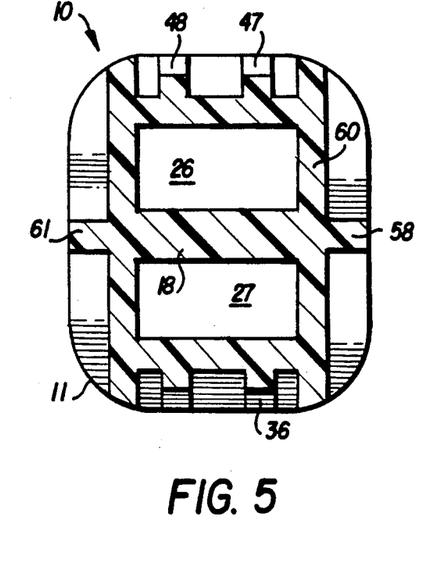
FIG. 5 is a cross-sectional view of the first embodiment of the invention taken at line B—B and viewed towards the rear or distal end thereof.

A further section B—B of the first embodiment housing 11 is shown in FIG. 5. Interior details of the housing 11 are shown in this view. Again, channels 50, 75, 76, 77 are shown adjacent arms 23, 78, separating the arms and also partially separating members 47, 48 from the adjacent side portions of the drum 60. Divider 18, molded integral with drum 60 and members 58, 61 provides structural rigidity and helps maintain the integrity of housing 11. Passageway 31 is divided into two channels 26, 27 bounded by drum 60, arms 23, 78, and divider 18.

Figure 6:
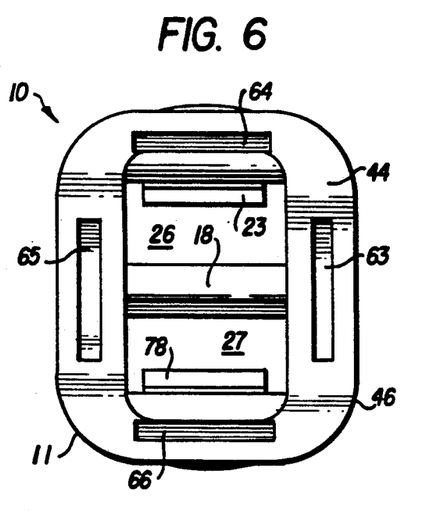
FIG. 6 is an end view of the first embodiment of the invention as seen from the rear or distal end of the device.

Viewed from the distal end 14 of housing 11 as shown in FIG. 6, the drive notches 63, 64, 65, 66 are clearly visible in the rear surface 44 of flange 46. Also shown is passageway 31, as divided into two channels 26, 27 by divider 18. Interior portions of arms 23, 78 are visible, including one of the teeth 17 of the two arms 23, 78.

Visible in proximal end 15 view (FIG. 7) is housing 11 and respective left and right sections 73, 74 of flange 43, including the front surface 42 thereof (the rear surface 41 is seen in FIG. 2). Anvil 32 is shown terminating divider 18 (visible in FIG. 4) to separate the passageway 31 into first and second channels 26, 27.

Retaining teeth 52, 57, 82, and 83 are readily visible in FIG. 7 as are surfaces 51, 56, 84, 85, respectively. Also seen are channels 50, 75, 76, 77, dividing the flange portions 73, 74 along sides or arms 23, 78.

A vertical longitudinal split sectional view along line D—D of FIG. 8 provides a view such as FIG. 9, which is further explained in detail in combination with FIGS. 10 and 11. The passageway 31 is seen at distal end 14; it is split into channels 26, 27 by divider 18, the proximal termination of which functions as an anvil in cooperation with teeth 17. With fitting 10 fully inserted as in FIG. 9, cable 25 is firmly locked in channel 27 as shown; the section view is offset at the divider in FIG. 9 such that channel 26 and cable 24 are not shown in this view (see FIGS. 10 and 11). Tapered wire entry 35 facilitates insertion of wire into the fitting 10 and avoids wear caused by sharp edges.

In use, the arms 23, 78 may be inserted partially through an aperture 34 in panel 28 (see also FIGS. 914 11). Upon insertion, the insertion faces 29 of lips 19 facilitate easy entry of the arms into the panel 28 through aperture 34. Details of the arms 23, 78 can be seen in FIG. 3. The arms 23, 78 are generally of the same material as the housing 11; being cantilevered, they flex to permit entry into the panel 28 to a staging position (illustrated in FIG. 10) from which the device 10 cannot easily be withdrawn; lip 19 stop face 13, abutting the panel 28, prevents such withdrawal.

The view of fitting 10 shown in FIG. 10 specifically illustrates insertion of the fitting to the first position. Behind lip 19 stop face 13 along the length of arm 23 is a first outward face portion 20, which may preferably be arcuate; this face portion 20 is thus adapted for fitting the inside of the aperture 34 and should preferably be greater in length than the expected thickness of the panel 28 at aperture 34. Following face 20 along the arm 23 towards the housing 11 is an outwardly inclined arcuate ramp or intermediate face 21, followed by a shorter inwardly inclined arcuate ramp face 22, which for the present preferred embodiment illustrated, is preferably at least as long as the panel 28 is thick. Lip 49 portion of arm 23 (see FIGS. 10 and 11) provides an additional stop for preventing insertion beyond flange 43. Lip 33 on arm 78 functions similarly. A plurality of retaining teeth 52, 57, 82, 83 are spaced from the housing 11 by a gap illustrated by notch 55 of FIG. 3. The dimension of the notch should be equal to or greater than the thickness of the panel 28 at the aperture 34 location.

As arms 23, 78 are inserted further into panel 28, face 22 is compressed until it is approximately of the same outer diameter as the inner diameter of aperture 34. The retaining teeth 52, 57, 82, 83 are shaped to extend to a diameter greater than that of aperture 34. They may be partially cantilevered or undercut and tapered as shown in this example, from the proximal end 15 towards the main housing end of the fitting 10 to ease insertion flexure and locking. It is expected that the fitting must ordinarily be at least slightly forced the remaining distance through the aperture 34. Housing 11 is provided with an at least partial circumferential flange 43 to prevent housing 11 from being forced through aperture 34 into the panel. This flange 43 may be an integral or separate part of housing 11. The final forced insertion of the fitting 10 into aperture 34 may require manually applied force, as by striking the fitting 10 with a small hammer. The slight hammering force may be applied directly or via a screwdriver or other tool. Note that the fitting may also be inserted fully into the panel mounting hole, then the cables inserted.

One or more dividers 18 may be included within passageway 31 to divide it 31 into discrete channels 26, 27 for receiving the wires or cables 24, 25. In the present first illustrative embodiment a single divider 18 is shown, forming two channels 26, 27 through which cables 24, 25 have been inserted. Here, divider 18 is rounded at the wire entry end 14 to facilitate cable 24, 25 insertion. The wire exit end 15 of divider 18 is terminated to form an anvil 32 approximately opposite teeth 17 of arms 23, 78.

As the fitting 10 is inserted via arms 23, 78 into the panel, the aperture diameter forces arms 23, 78 inward in the manner of a fulcrum such that the gripper teeth 17 area is forced firmly into contact with the divider 18 at terminating anvil 32. The cable 25 is thereby firmly and forcibly compressed by the fulcrum action between teeth 17 and anvil 32. For this reason, it is preferable that the housing 11, teeth 17, and anvil 32 be of an electrically non-conductive material. Numerous commercially available plastics, including Underwriters' Laboratories Section 94-1 approved ABS (acrylonitrile butadiene styrene), polyesters and polyolefins, including polyethylene and polypropylene are suitable. These materials may be easily molded into the complex shape required for fitting 10. It is further preferable that the dimensions of the fitting 10 arms 23, 78, teeth 17, divider 18, and anvil 32 be selected to enable firm compression of the cables 24, 25 without damaging same, and further that these dimensions be selected to meet this compression limitation for a range of cable thicknesses and cable sizes, giving due regard to the manufacturing tolerances inherent in the manufacture of the panel 28 aperture 34 diameters, cable 24, 25 size variations, and of the fitting 10.

In use with the fitting 10 of this invention, the cable or cables are brought through an aperture in the panel and both installed through and mechanically fastened to the panel to guard against unintentional removal of the wires or cables. In the first embodiment, each cable is passed via at least one channel in the fitting into the box or panel. The cable is secured to the fitting between inward directed gripping teeth on the arms between the arms and a terminating anvil portion of a divider. The fitting, in turn, is secured to the panel by a plurality of positive locking teeth such as lips on the arms. Sloping faces on the arms facilitate resilient entry of the fitting into the panel, enabling the fitting to be locked in place, and assuring that it cannot readily be withdrawn.

Figure 15:
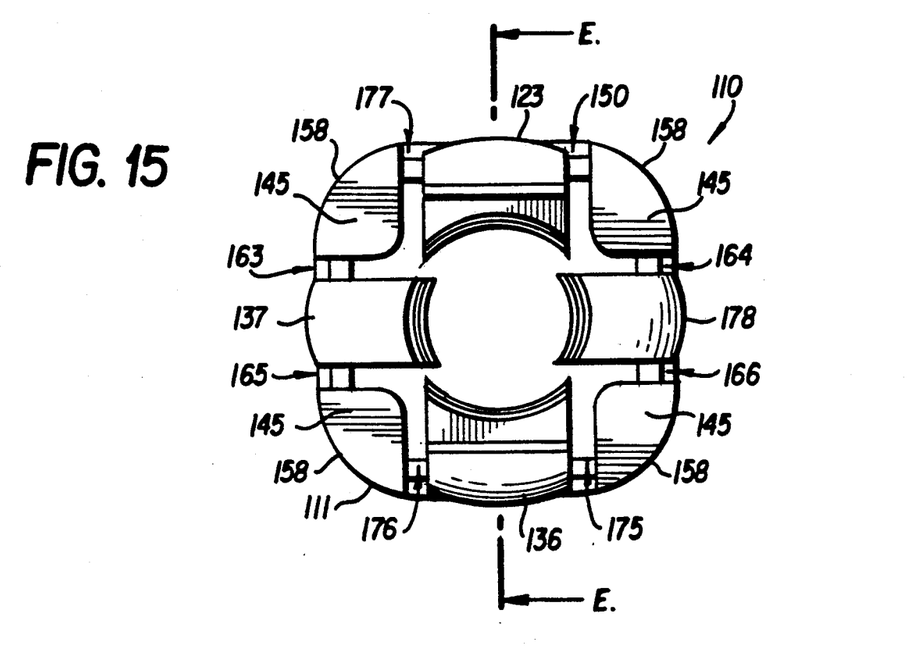
FIG. 15 is a front view of the fitting of FIG. 12.
Figure 16:
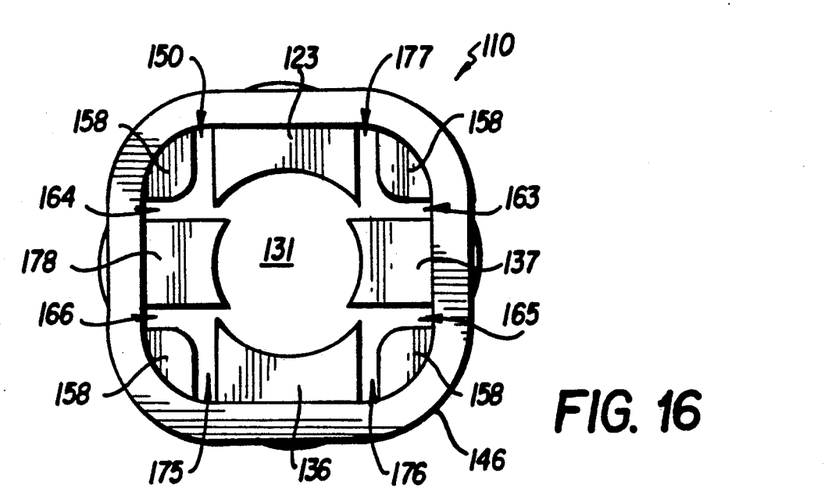
FIG. 16 is a rear view of the fitting of FIG. 12.

Shown in FIGS. 12 through 21 is a connector or fitting 110 constructed in accordance with the second preferred embodiment of the present invention. Referring first to FIGS. 12-16, the fitting 110 comprises a housing 111 having first and second pluralities of cantilevered arms, including long arms 123, 136 and short arms 137, 178, all of which extend generally parallel to the longitudinal axis of the housing. Housing 111 has an elongated tubular central portion forming a central passageway 131 and making the housing somewhat spool-shaped. Housing 111 may be of any similar shape which is readily manufactured (such as by injection molding). This second embodiment has a generally rectilinear cross section with rounded corners for ease of manufacture. Each of the first and second pluralities of cantilevered arms may be of different length and/or width. As seen in FIGS. 15 and 16, for example, arms 123, 136 may be of greater width than arms 137, 178.

The four cable contacting arms 123, 136, 137, 178 include gripping teeth 117 on the inner surface thereof. Gripping teeth 117 are formed on the inner faces of arms 123, 136, 137, 178, transverse to the length thereof at the location of gripping heads 116. These teeth 117 are adapted for firm and efficient gripping of a wire or cable (not shown in FIG. 17). The teeth 117 may be flat, oval, or rounded across the face width of the respective arm (i.e., normal to the longitudinal axis of the fitting) in order to provide an enhanced cable-gripping function (see FIG. 15).

Figure 13:
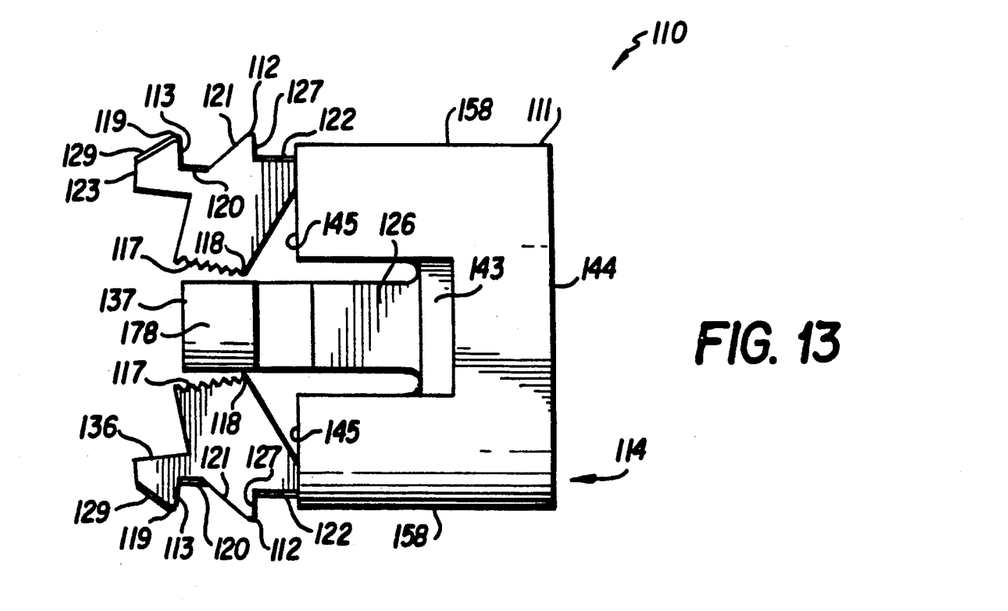
FIG. 13 is a side view of the fitting of FIG. 12.
Figure 14:
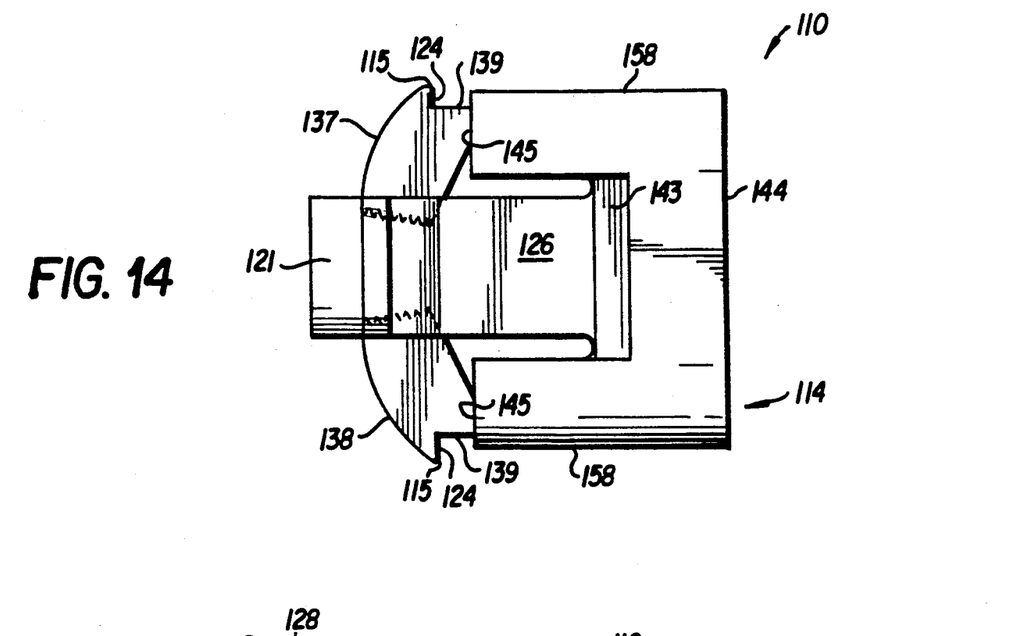
FIG. 14 is a plan view of the fitting of FIG. 12.

The first pair of arms 123, 136 are oppositely disposed around passageway 131 and include lips 119 at their free ends. The lips 119 extend radially and have tapered or sloped first insertion faces 129 and antiwithdrawal faces 113 (FIG. 13). Sloped second insertion faces 121 are provided on each arm 123, 136 along with additional antiwithdrawal lips 112 and antiwithdrawal faces 127. An outward face portion 122 of each of the arms 123, 136 is provided for contacting the inner periphery of the panel aperture 134.

The second pair of arms 137, 178 include sloped insertion faces 138 similar to the faces 121 of arms 123 and 136, as well as outward face portions 139 which contact panel aperture 134 in a manner similar to outward face portions 122 of arms 123, 137. Faces 138, 139 are located in approximately the same transverse location as the faces 121, 122. Arms 137, 178 are also provided with antiwithdrawal lips 115 and antiwithdrawal faces 124 corresponding to the lips 112 and faces 127 of arms 123, 136.

The insertion faces 129, 121, 138 are preferably curved along circular arcs in planes transverse to the axis of passageway 131 to facilitate entry of the arms through a round aperture in a panel. Housing 111 is adapted to receive a cable at a distal wire entry end 114 and the cable exits housing 111 at a proximal end 115. Located at the distal end 114 of the housing 111 is a support portion 146 extending along the length of the housing 111 for a dimension T1 (see FIG. 17) which is uninterrupted about its entire perimeter to preserve the strength and structural integrity of the housing as a whole.

Housing 111 incorporates a number of other structural features, including a plurality of posts 158 extending longitudinally from the support portion 146 in the same direction as the arms. The end faces 145 of the posts 158 function as stops to limit the depth of insertion of the fitting into a panel. Tapered surfaces 143 are disposed transversely between the posts 158 and determine the width or axial dimension of the support portion 146 between the end surface 144 of the housing and the surfaces 143. The structural strength of the fitting is related to that dimension. Posts 158 and arms 123, 136, 137, 178 substantially define the central passageway 131. While the support portion 146 is shown as a square with rounded corners in end view (FIG. 16), it will be understood that other forms may be used, such as circular or polygonal, i.e., rectangular, with or without rounded corners.

A significant difference between the first embodiment fitting 10 and the second embodiment fitting 110 is the absence of a passageway divider 18 (and thus anvil 32) in the passageway 131 of housing 111.

FIG. 16 shows the uninterrupted perimeter of support portion 146 to which the arms 123, 136 and 137, 178 and posts 158 are attached, forming eight channels or slots 150, 163, 164, 165, 166, 175, 176, and 177 between the posts and arms. These channels, in turn, extend longitudinally through the entire housing 111 up to the surfaces 143 and thus enhance the free cantilevered movement or flexibility of the arms 123, 136, 137, 178.

Figure 17:
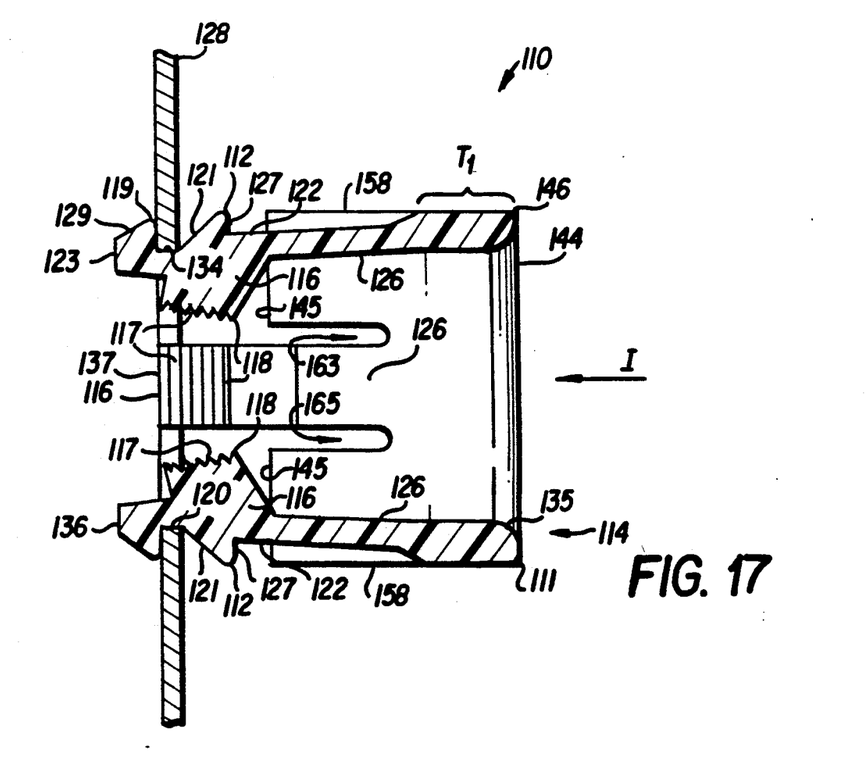
FIG. 17 is a sectional view of the fitting of FIG. 12 taken at section line E—E of FIG. 15 and installed into the panel to a first, or staging position.
Figure 18:
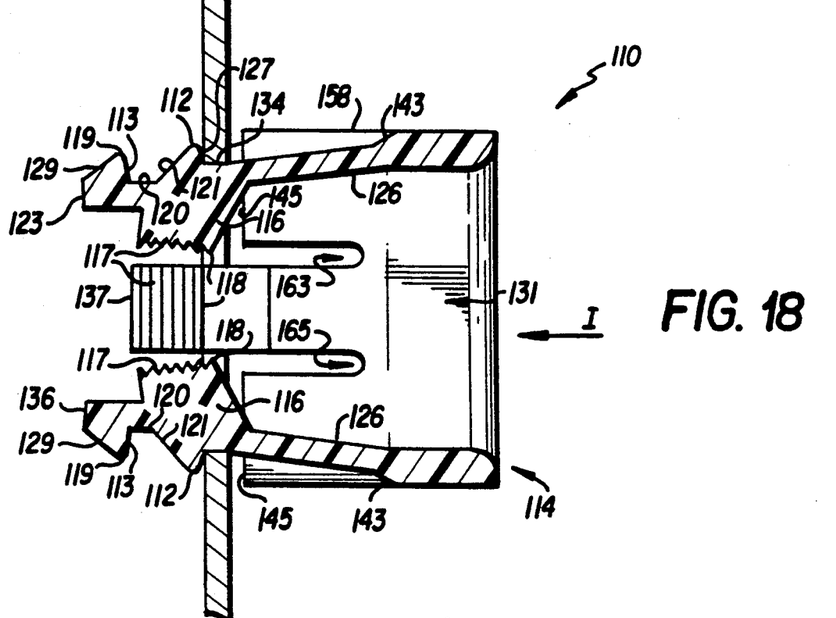
FIG. 18 is a sectional view of the fitting of FIG. 12 installed into the panel to a second, fully installed position taken at section line E—E of FIG. 15.
Figure 19:
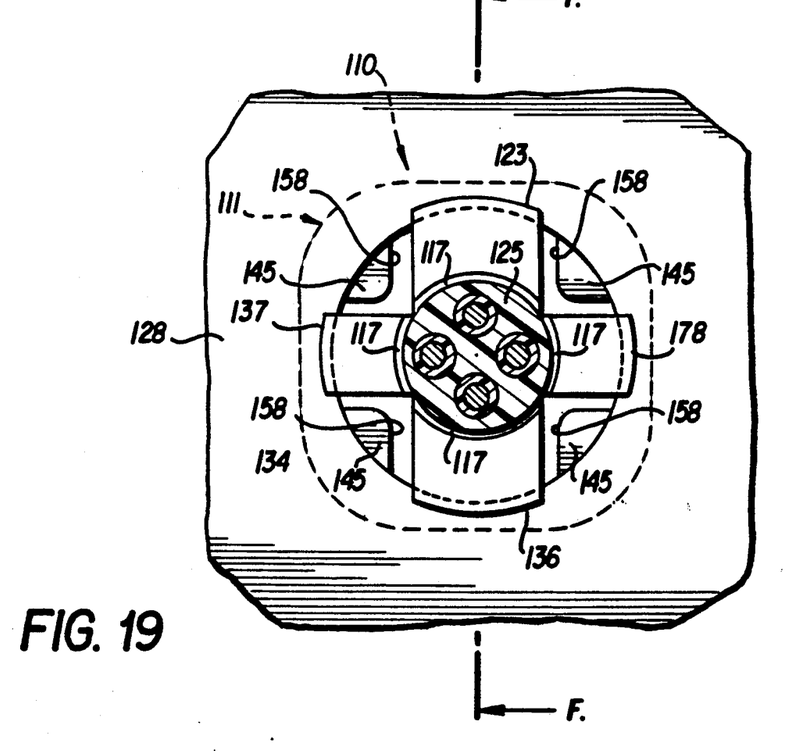
FIG. 19 is a proximal end view of the fitting of FIG. 12 containing a pair of conventional NM-type cables, as seen from inside a panel.
Figure 20:
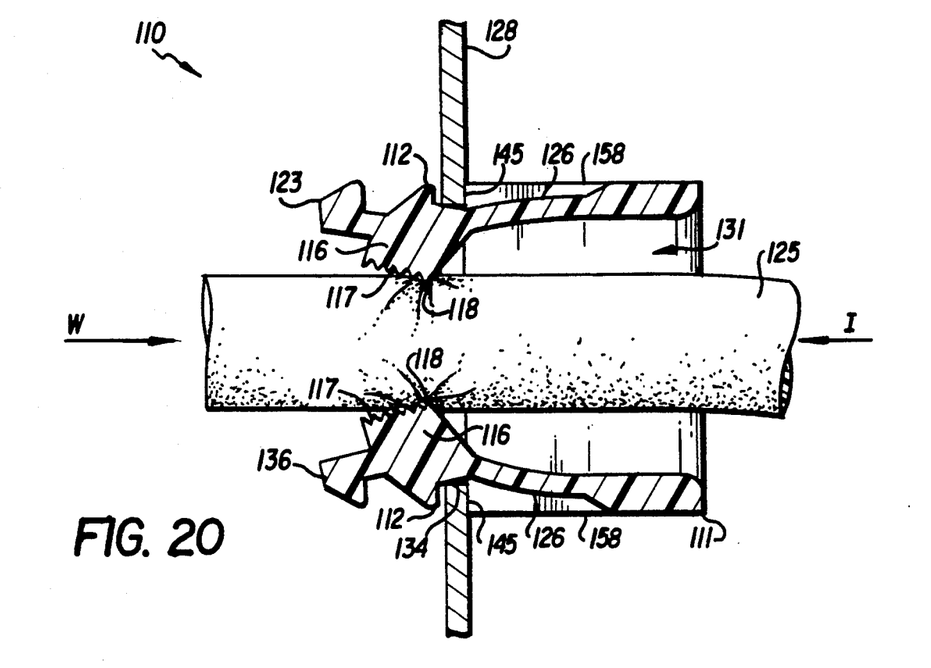
FIG. 20 is a sectional view of the fitting of FIG. 12 containing an /NM cable and installed into the panel to a second, fully installed position taken at section line F—F of FIG. 19.
Figure 21:
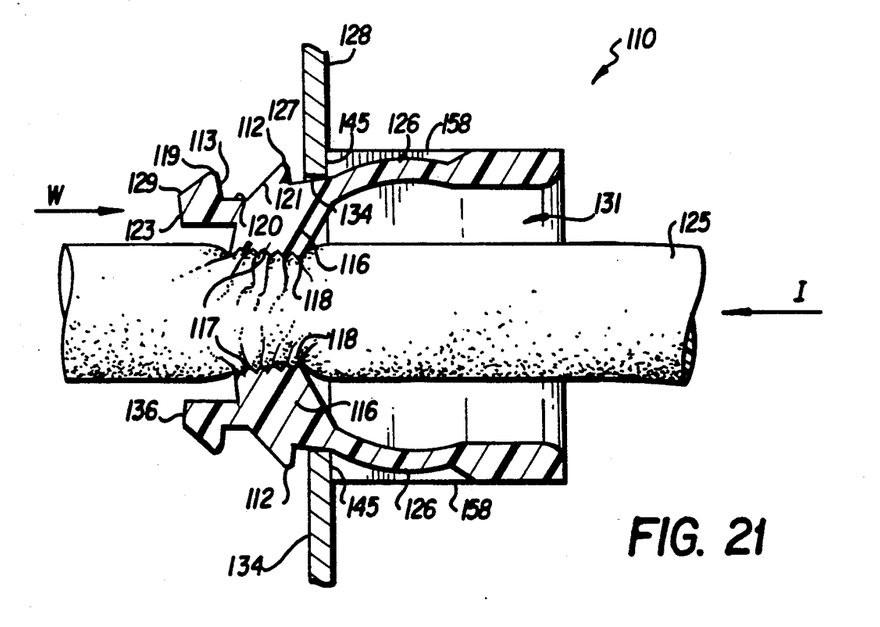
FIG. 21 is a sectional view of the fitting of FIG. 12 as in FIG. 20, showing clamping action of the arms upon attempted withdrawal of the cable.

FIGS. 17 and 18 show the fitting in cross-sectional view with no cable installed, and FIGS. 20 and 21 show the fitting with a typical non-metallic cable installed. FIG. 19 is a sectional view normal to that of FIGS. 17, 18, 20, and 21, and illustrates the relationship of the cable (and its internal component insulated wires) with the fitting 110.

As best seen in FIGS. 17 and 18, each arm 123, 136, 137, 178 (arm 178 is not seen in FIG. 17) includes a thinner portion along its length which functions as a flexible hinge 126 thereby forming a pivot in the manner of a hinge adjacent the inclined surface and providing the arms with the needed flexibility for entry through the panel aperture 134. The hinges may be of uniform thickness and/or width, or may vary in thickness and/or width among their respective pairs 123, 136 and 137, 178. The hinges 126 must flex sufficiently to enable rotation of the respective gripping heads 116 as lips 119 enter the aperture.

Referring now to FIGS. 17-19, the manner of insertion of the fitting into an aperture will be described. The fitting 110 is inserted into the panel 128 (in direction I) such that arms 123, 136 and 137, 178 pass through aperture 134. The inner diameter of the aperture 134 first forces arms 123, 136 and then all of the arms 123, 136, and 137, 178 inward in the manner of a fulcrum due to the increased radial diameter presented by the sloped faces 129 of lips 119. Teeth 117, 118 are forced to the center of the aperture 134.

Enhanced initial gripping action occurs when the first tooth 118 of at least one head 116 toothed area is formed with an inclination angle of about 10 degrees to about 25 degrees normal to the longitudinal axis of the passageway 131 and against withdrawal. An angle of about 15 degrees to about 20 degrees has been found especially advantageous. The remaining teeth may be disposed at an angle of between about 5 degrees and about 45 degrees, preferably of uniform angle and spacing. The teeth preferably conform at least partially to the anticipated cable cross section, and preferably are inclined towards the proximal end of the fitting 110 to facilitate easy entry passage of the cable therethrough.

FIG. 17 shows the arms 123, 136 of a fitting 110 inserted into an aperture 134 to the first or staging position, at which position lips 119 engage the panel 128 and faces 120 engage the inner periphery of the aperture 134. At this first position, only arms 123, 136 protrude into the aperture. The cable may be inserted at this time or subsequently, as will be described; the cable is omitted from FIGS. 17 and 18 in order to show more clearly the engagement of the fitting 110 with the panel 128 through aperture 134. FIGS. 18 and 19 illustrate the fitting 110 installed to the second, or fully inserted position. Continued urging of the fitting inwardly will cause the stop face 145 to engage the panel 128 and limit further axial movement. In the fully inserted position, both arms 123, 136 and the arms 137, 178 protrude into the aperture. Lips 112 on arms 123, 136 and lips 115 on arms 137, 178 prevent withdrawal of the fitting 110 from the panel 128. Antiwithdrawal faces 127 and 124 on arms 123, 136, and 137, 178, respectively, engage the panel 128 on the interior side thereof. The stop faces 145 of the post members 158 abut the panel on the exterior side thereof, ensuring that fitting 110 cannot enter the panel. The relative spacing of faces 124, 127 and 145 is selected to accommodate the standard range of panel thicknesses. Once the fitting 110 has been inserted to at least the first position, as shown in FIG. 17, the cable may be inserted through passageway 131 in housing 111 and thus panel 128 for use. The fitting 110 may also be inserted to the second position and the cable then installed, as is shown in FIGS. 18 and 19. Whereas FIG. 19 illustrates a cable which essentially fills the interior area formed by the teeth 117, 118, it should be understood that the fitting may also accommodate more than one smaller cable, and cables of other than round cross sections (not shown).

Now referring to FIGS. 20 and 21, the cable gripping function of the teeth 117, 118 and the gripping heads 116 on the arms 123, 136, (and on arms 137, and 178 which are not visible in these views) are shown. At least one cable is inserted into the fitting 110 in direction I, through housing 111 and past the panel 128 through a limited area formed by the teeth 117, 118. The angle and/or spacing of the first teeth 118 on each gripping head 116 is configured such that at least one of such first teeth 118 contacts the cable 125 exterior surface. Attempted withdrawal of the cable 125, FIG. 21, causes hinges 126 to flex and gripping heads 116 to more tightly engage the cable as is shown in FIG. 21; lips 112 prevent the fitting from being withdrawn from the panel whereas teeth 117, 118 prevent the cable from being withdrawn from the fitting. Note that as the heads 116 are pulled into tighter engagement with the cable 125 by withdrawal thereof, more of the teeth 117 come into contact with the cable, providing a still better grip on the cable (see FIG. 21). Thus attempted withdrawal of the cable 125 from the fitting 110 results in both additional teeth 117 engaging the cable 125, a better grip, and tighter compression of the heads 116 against the cable.

Although only preferred embodiments are specifically illustrated and described herein, it will be appreciated that many modifications and variations of the present invention are possible in light of the above teachings and within the purview of the appended claims without departing from the spirit and intended scope of the invention.

We claim:

1. A fitting for securing cable and the like to a panel, comprising:
    a) a housing having first arms and a passageway therethrough for enclosing a cable, said housing including a first end and a second end, said second end having a support portion with an uninterrupted perimeter;
    b) means at said first and end for securing said fitting to said panel, said cable and said fitting securing means adapted to be inserted into the panel from the same direction, said fitting securing means comprising a first and second lip means on said first arms for securing said fitting to said panel at two different positions; and
    c) means for securing said cable against withdrawal from said housing, said cable securing means comprising first gripping means on said first arms.

2. The fitting of claim 1, wherein said fitting is made of an electrically insulating polymer material selected from the group including polyesters, polyolefins, polyethylenes, polypropylenes, and acrylonitrile butadiene styrene.

3. The fitting of claim 1, wherein said housing includes second arms, said means for securing said fitting to said panel further comprising third lip means on said second arms at the same position as one of said first and second lip means, said cable securing means further comprising second gripping means on said second arms.

4. The fitting of claim 3 including first and second hinge means for hingedly and resiliently mounting said first and second arms respectively to the second end of the housing.

5. The fitting of claim 4, wherein said first and second hinge means each comprise a reduced cross section of each of said first and second arms.

6. The fitting of claim 3, wherein said first lip means is adapted to secure said fitting to said panel at a first position at a first depth of insertion into said panel and said second and third lip means are adapted to secure said fitting to said panel at a second depth of insertion into said panel.

7. The fitting of claim 6, including stop means on said housing for limiting the insertion of said fitting into said panel to said second depth of insertion.

8. The fitting of claim 7, wherein said stop means comprises a plurality of posts extending from the second end of the housing, said posts each having a stop face at right angles to the axis of the passageway.

9. The fitting of claim 7, wherein said first arms comprise a first pair of arms around said passageway arranged opposite one another and said second arms comprise a second pair of arms arranged about said passageway opposite one another, said stop means comprising a post arranged between respective first and second arms, said posts having a stop face at right angles to the axis of the passageway located at the second depth of insertion.

10. The fitting of claim 3, wherein each arm includes an enlarged head portion, said first and second gripping means comprising gripping teeth on the internal surfaces of said enlarged head portions adapted to confront and grip a cable in the passageway through the housing.

11. The fitting of claim 10, wherein said gripping teeth form a generally circular aperture about the passageway.

12. The fitting of claim 10, wherein said housing has a central longitudinal axis spaced from the length dimension of said arms, said gripping teeth forming a cable aperture about said longitudinal axis.

13. The fitting of claim 12, wherein said teeth are disposed at an angle of from about 5 degrees to about 45 degrees normal to said longitudinal axis.

14. The fitting of claim 12, wherein said gripping teeth are spaced apart along the length dimension of at least one arm at a first spacing, and the second and subsequent teeth are spaced apart along the length dimension of said at least one arm at a different spacing.

15. The fitting of claim 12, wherein the teeth are arrayed in annular rows about said longitudinal axis, and said first row of said teeth is disposed at an angle normal to said longitudinal axis which is greater than the second and subsequent teeth.

16. The fitting of claim 12, wherein the teeth are arrayed in annular rows about said longitudinal axis, and said first row of said teeth is disposed at an angle normal to said longitudinal axis which is smaller than the second and subsequent teeth.

17. The fitting of claim 12, wherein said teeth are disposed at an angle of from about 10 degrees to about 25 degrees normal to said longitudinal axis.

18. A unitary fitting for securing electrical cable through panel apertures, comprising:
   a housing having first end and a second end, said second end having a support portion with an uninterrupted perimeter;
   a plurality of post members extending from said housing first end,
   a first plurality of arms having a length dimension and extending from said housing first end and having outwardly disposed griping lips disposed along the length dimension thereof, and
   additional arms each having a length dimension and extending from said housing first end and having an outwardly disposed panel gripping lip disposed along the length dimension thereof;
   wherein each of said arms includes along its length an articulatable portion and a plurality of inwardly disposed teeth adapted to grip said cable.

19. The fitting of claim 18, wherein said first and second outwardly disposed lips comprise means for securing said fitting to said panel at respective first and second positions.

20. The fitting of claim 18, wherein each of said arms includes a head portion, spaced from the housing second end and supporting said cable griping teeth.

21. The fitting of claim 20, wherein the articulatable portion is interposed between the housing second end and said head portion.

22. A fitting for securing and the like to a panel, comprising:
   a) a housing having a passageway therethrough for enclosing a cable and including a first end and a second end, said second end having a support portion with an uninterrupted perimeter;
   b) means at said first end for securing said fitting to said panel; and
   c) means for securing said cable against withdrawal from said housing;
wherein said housing includes first arms, said means for securing said fitting to said panel comprising a first and second lip means on said first arms for securing said fitting to said panel at two different positions, said cable securing means comprising first gripping means on said first arms; wherein said housing includes second arms, said means for securing said fitting to said panel further comprising third lip means on said second arms at the same position as one of said first and second lip means, said cable securing means further comprising second gripping means on said second arms; wherein said first lip means is adapted to secure said fitting to said panel at a first position at a first depth of insertion into said panel and said second and third lip means are adapted to secure said fitting to said panel at a second depth of insertion into said panel; wherein said first arms comprise a first paris of arms around said passageway arranged opposite one another and said second arms comprise a second pairs of arms arranged about said passageway opposite one another, said stop means comprising a post arranged between respective first and second arms, said posts having a stop face at right angles to the axis of the passageway located at the second depth of insertion; and further including stop means on said housing for limiting the insertion of said fitting into said panel to said second depth of insertion.

23. A fitting for securing and the like to a panel, comprising:
   a) a housing having a passageway therethrough for enclosing a cable and including a first end and a second end, said second end having a support portion with an uninterrupted perimeter;
   b) means at said first end for securing said fitting to said panel, said cable and said fitting securing means adapted to be inserted into the panel from the same direction; and
   c) means for securing said cable against withdrawal from said housing without substantially inhibiting cable entry thereinto,
said cable securing means and said fitting securing means being formed on at least two articulatable arms connected to said housing.

* * * * *

UNITED STATES PATENT AND TRADEMARK OFFICE
CERTIFICATE OF CORRECTION

PATENT NO. : 5,118,057

DATED : June 2, 1992

INVENTOR(S) : William B. MARTIN et al

It is certified that error appears in the above-identified patent and that said Letters Patent is hereby corrected as shown below:

Column 5, line 11, after "FIG. 11" insert --is--;
line 32, "/NM" should be --NM--;

Column 8, lines 13 and 14, "914 11" should be --9-11--.

IN THE CLAIMS:

Claim 18, column 14, line 1, after first occurrence of "disposed" insert --panel--.

Claim 22, column 14, line 19, after "securing" insert --cable--;

line 43, "paris" should be --pair--
line 45, "pairs" should be --pair--;

UNITED STATES PATENT AND TRADEMARK OFFICE
CERTIFICATE OF CORRECTION

PATENT NO. : 5,118,057
DATED : June 2, 1992
INVENTOR(S) : William B. Martin, et al It is certified that error appears in the above-indentified patent and that said Letters Patent is hereby corrected as shown below:

Claim 23, column 14, line 53, after "securing" insert --cable--.

Signed and Sealed this

Fifth Day of October, 1993

Attest:

BRUCE LEHMAN

*Attesting Officer*    *Commissioner of Patents and Trademarks*